United States Patent [19]

Hemmelgarn et al.

[11] Patent Number: 4,534,725

[45] Date of Patent: Aug. 13, 1985

[54] APPARATUS FOR MANUFACTURING OVENABLE PAPERBOARD ARTICLES

[75] Inventors: Donald J. Hemmelgarn, Minster; Arthur L. Grow, Versailles, both of Ohio

[73] Assignee: International Paper Company, New York, N.Y.

[21] Appl. No.: 364,305

[22] Filed: Apr. 1, 1982

[51] Int. Cl.[3] .......... B29C 17/00

[52] U.S. Cl. .......... 425/394; 425/324.1; 425/397; 425/398; 425/403.1; 249/134

[58] Field of Search .......... 425/384, 394, 395, 397

[56] References Cited

U.S. PATENT DOCUMENTS

| | | | |
|---|---|---|---|
| 164,520 | 6/1875 | Chalmers | 72/328 |
| 208,097 | 9/1878 | House | 264/324 |
| 209,686 | 11/1878 | House | 72/358 |
| 308,098 | 11/1884 | Robertson | 264/285 |
| 311,409 | 1/1885 | Butz et al. | 493/58 |
| 441,105 | 11/1890 | Mohs | 425/404 |
| 456,878 | 7/1891 | Bird | 425/404 |
| 520,283 | 5/1894 | Witz | 264/136 |
| 529,753 | 11/1894 | Saltzkorn et al. | 425/89 |
| 610,630 | 9/1898 | Miller | 425/398 |
| 643,236 | 2/1900 | Rogers et al. | 425/398 |
| 789,563 | 5/1905 | Polk | 425/398 |
| 843,854 | 2/1907 | Waterman | 493/74 |
| 860,385 | 7/1907 | Jenkins | 156/224 |
| 891,642 | 6/1908 | Tietzmann | 493/154 |
| 949,957 | 2/1910 | Falk | 425/299 |
| 999,303 | 8/1911 | Falk | 425/299 |
| 1,029,488 | 6/1912 | Burghoff et al. | 425/299 |
| 1,072,915 | 9/1913 | Cook et al. | 425/299 |
| 1,159,812 | 11/1915 | Tucker | 425/90 |
| 1,221,846 | 4/1917 | Dreux | 264/292 |
| 1,227,534 | 5/1917 | Frankland | 425/298 |
| 1,253,316 | 1/1918 | Weiland | 425/305.1 |
| 1,277,428 | 9/1918 | Kondolf | 493/85 |
| 1,342,239 | 6/1920 | Walter | 493/354 |
| 1,379,080 | 5/1921 | Bruckman | 425/137 |
| 1,474,748 | 11/1923 | White | 493/8 |
| 1,477,437 | 12/1923 | Gaynor | 425/385 |
| 1,534,698 | 4/1925 | Gansert et al. | 425/298 |
| 1,535,757 | 4/1925 | Barbieri | 493/155 |
| 1,538,199 | 5/1925 | Maxwell | 264/136 |
| 1,598,911 | 9/1926 | Hochmuth et al. | 425/93 |
| 1,607,528 | 11/1926 | Grover | 226/27 |
| 1,668,349 | 5/1928 | Baum | 215/325 |
| 1,823,475 | 9/1931 | Scudds | 493/363 |
| 1,856,319 | 5/1932 | Cooper | 425/227 |
| 1,879,555 | 9/1932 | Simmons | 264/153 |
| 1,882,683 | 10/1932 | Abrams | 264/292 |
| 1,904,268 | 4/1933 | Bronson | 264/153 |
| 1,912,931 | 6/1933 | Clay | 264/137 |
| 2,029,919 | 2/1936 | Fuller | 226/27 |
| 3,305,434 | 2/1967 | Bernier et al. | 425/397 X |
| 3,518,334 | 6/1970 | Carrigan | 425/397 X |
| 3,561,057 | 2/1971 | Butzko | 425/397 X |
| 3,647,335 | 3/1972 | Brown | 425/395 X |
| 3,785,762 | 1/1974 | Butzko | 425/397 X |
| 3,902,347 | 9/1975 | Ridgway et al. | |
| 4,026,458 | 5/1977 | Morris et al. | |
| 4,127,328 | 11/1978 | Meadors | 425/394 X |

FOREIGN PATENT DOCUMENTS

| | | |
|---|---|---|
| 1026121 | 9/1957 | Fed. Rep. of Germany . |
| 1574908 | 7/1969 | France . |

*Primary Examiner*—J. Howard Flint, Jr.
*Attorney, Agent, or Firm*—Jeffrey H. Ingerman

[57] ABSTRACT

A method and apparatus are disclosed for imparting a desired shape to a paperboard blank. The blank is formed between two dies for a sufficient length of time and with sufficient force to set the form, while moving the dies in tandem along a predetermined portion of a reciprocation path. Because the formed blank remains in dwell while the dies are moving in tandem, it is not necessary to hold the dies stationary to ensure permanent formation of the blank. This allows greater production speeds.

19 Claims, 19 Drawing Figures

76
72
74
94
32
34
98
118
112
116
114
124
126
122
130
170
168
150
140
166
138
164
160
162
134
136
142
144
128
146
172
110
120

APPARATUS FOR MANUFACTURING OVENABLE PAPERBOARD ARTICLES

BACKGROUND OF THE INVENTION

One example of an ovenable paperboard tray is disclosed in U.S. Pat. No. 4,026,458, issued May 31, 1977, to Morris et al. for "Deep Drawn Paperboard Container and Process for Making It", assigned in common with the present application. The disclosure of U.S. Pat. No. 4,026,458 is incorporated herein by reference.

One conventional process for forming such trays includes four stages. In the first stage, the paper is pulled from a roll, through a de-curl section and into a free loop. A feed wheel then meters the paper into the machine. The feed wheel is typically controlled by a stroke arm one end of which pivots around an eccentric shaft and the other end of which moves back and forth on an overrunning clutch attached to a shaft connected to the feed wheel. The paper is then fed in set increments into the machine, generally at about a 45° angle to the horizontal. No precision-ground or precision-paralleled rolls are used in feeding the paper. As a result, precise control and adjustment of the web alignment relative to the press are not readily possible.

The paper is then scored to ensure that the paper will fold at the desired locations during the forming process. The paperboard is usually fed in with the coated side up, and the scoring blades are accordingly located on the reciprocating top platen of the scoring mechanism, while the complementary female grooves are on the stationary lower platen. After scoring, the paper is blanked. The blanks drop through the die platen and out of the die shoe into an aluminum blank transfer to be gravity-fed to the forming section.

The forming section of this type of press comprises a reciprocating platen (cam-operated, with spring return), a male die section bolted to the platen, and a female die section bolted to a bolster plate which is backed up by springs to limit the compression force. Each blank falls into the cast iron die and is positioned by means of stationary stops and guides. As the top die is lowered, a spring-loaded draw ring (sometimes a "brake pad" arrangement) comes in contact with the blank and holds it firmly while the top (male) die pushes or "draws" the paper into the lower die. The paper is held in dwell for 120° of the cam cycle. The top die is then raised, and the finished product is ejected by means of a plunger or is lifted out by the lower die. The product then falls onto a belt-driven conveyor and is carried away to be stacked and packaged.

Because a certain minimum dwell time is required to ensure the blank is properly formed, the number of strokes per minute that can be performed by this type of machine is limited.

With conventional presses of the type described, a certain amount of web material is wasted as a result of misalignment of the blanks. The wastage increases with the width of the web.

SUMMARY OF THE INVENTION

It is the principal object of the present invention to provide an apparatus for forming an ovenable paperboard tray or a similar object faster and with less waste than is conventionally possible.

It is another object of the invention to provide such an apparatus suitable for use with a web of any desired width within a relatively broad range.

It is another object of the invention to provide such an apparatus with which wastage is reduced compared to conventional equipment.

It is another object of the invention to provide such an apparatus with which positive control of the web is possible.

It is still another object of the invention to provide such an apparatus the operation of which is programmable.

According to the present invention, a three-stage apparatus are provided, in which a web is fed horizontally, with positive control, through a programmed, electronically controlled feed-in section to a scoring unit. After scoring, the web is fed up by a preset increment and is then blanked and formed, preferably in one double-action stroke, by means of a reciprocating die acting in cooperation with a complementary die supported on an air cushion. When the web is in position for blanking, it is clamped in place. The reciprocating die is lowered to blank the web. The upper die then continues downward, forming the blank by pressing it against the lower die. When the force the upper die exerts on the blank exceeds a certain value, the lower die begins to descend on its air cushion in tandem with the upper die. While the dies descend together in this manner, the blank is pressed with a force sufficient to ensure the permanent shaping of the blank. When the dies can descend no farther, they bottom out and are raised to their original positions.

Each die preferably comprises a plurality of distinct formers, so that several articles are formed simultaneously. Preferably, a respective vertically movable air-supported draw pad surrounds each former of the lower die to aid in forming the article without unwanted wrinkles. The upward motion of the draw pad lifts the finished tray to the paper flow level. An air jet is preferably used to eject the product from the apparatus.

Because the upper and lower dies press the paper tightly between them for a relatively long period of time while the dies are descending, the dies need not remain bottomed out long to ensure complete formation of the product, as in a conventional press. The duration of each stroke therefore need not be as long as in a conventional press, allowing faster operation and greater production.

Because the web movement is positively controlled, wastage due to misalignments of the web is greatly reduced.

Many other objects and advantages of the present invention will be more clearly understood from the following detailed description of one preferred embodiment, taken in conjunction with the accompanying figures, in which like reference characters refer to like elements throughout.

DETAILED DESCRIPTION OF THE PREFERRED EMBODIMENT

Figures 1, 2:
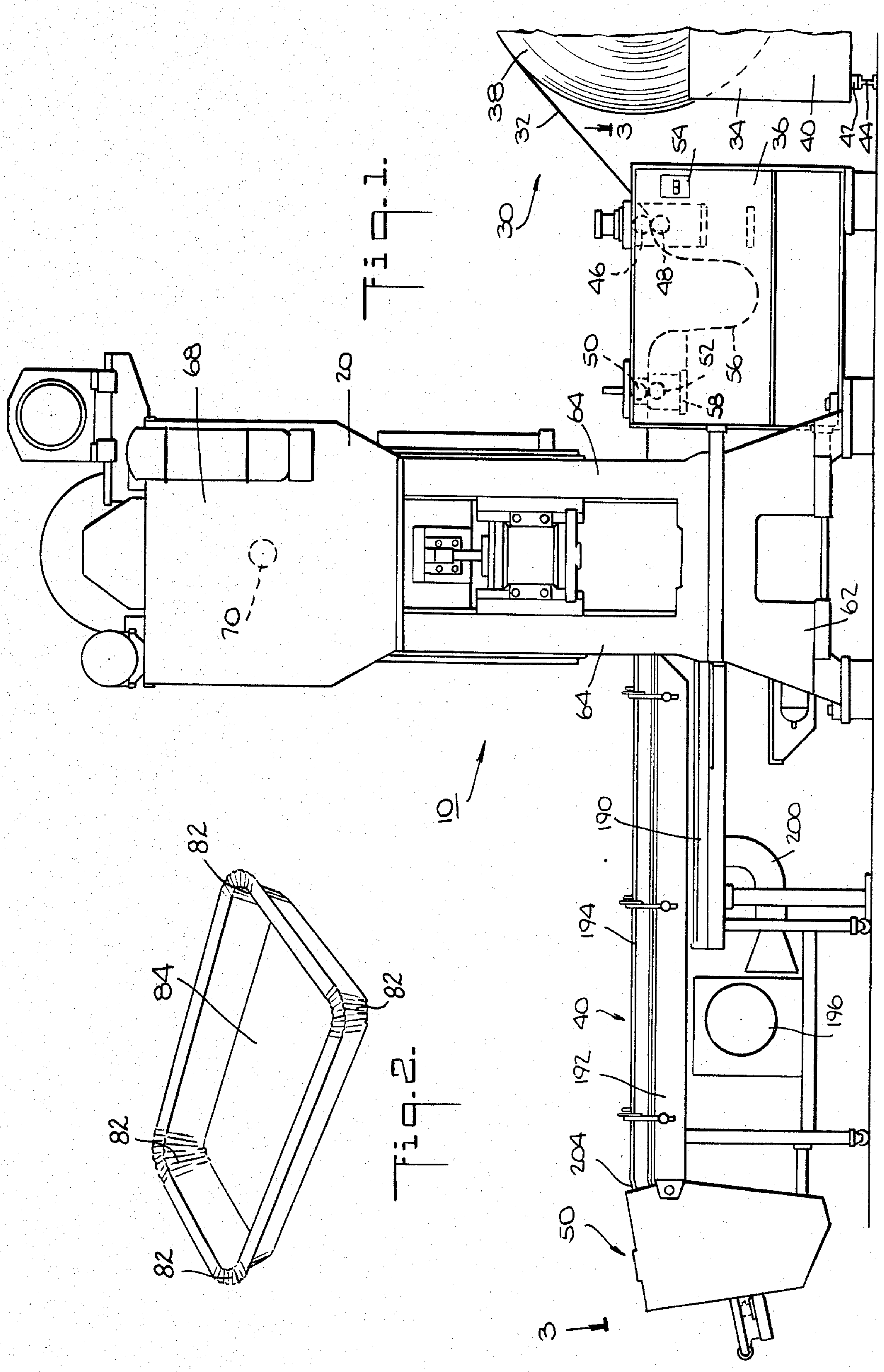
FIG. 1 is a side view of the preferred embodiment of the apparatus of the present invention.
FIG. 2 is a perpsective view of a typical article that could be produced with the apparatus of the invention.

As shown in FIG. 1, the preferred embodiment 10 of the apparatus of the invention comprises a press 20, a feed-in system 30 for supplying a web of paperboard or the like to the press 20 to be scored, blanked and formed, an output conveyor system 40 for transporting the finished products away from the press 20, and a stacking device 50 for stacking the finished products. A programmable electronic control system controls the operation of the entire apparatus 10.

The Feed-In System

The web 32 which is fed into the press 20 is taken from a roll support stand 34 (shown only partially). A feed-in metering unit 36 draws the web 32, one side of which is plastic-coated, from a roll 38 supported on the stand 34 and meters it into the press 20 at the correct speed in preset increments. As is shown, the back end of the feed-in unit 36 is preferably secured to the front end of the press 20.

The roll support stand 34 preferably comprises a base 40 supported on four wheels 42, which run on two parallel rails 44 (only one of which is shown) transverse to the direction of motion of the web 32 to permit adjustment of the alignment of the web 32 with the press 20. The base 40 supports right and left stanchions (not shown), which carry the roll 38 between them on spindles (not shown).

The feed-in meter unit 36 has a pair of precision-ground pull rolls 46, 48 mounted one above the other with their axes exactly parallel to each other and to that of the roll 38. The pull rolls 46, 48 grip the web 32 and pull it toward the press 20 under the control of the electronic control system. The back end of the feed-in station 36 has a pair of feed rolls 50, 52 similar to the pull rolls 46, 48, being mounted one above the other with their axes parallel to those of the pull rolls 46 48. The feed rolls 50, 52 feed the web 32 into the press 20 in preset increments the length of which can be adjusted by means of a knob on a control panel 54.

The portion of the web 32 between the pull rolls 46, 48 and the feed rolls 50, 52 hangs in a free loop 56. Photoelectric sensors 58 are provided to detect when the loop 56 is too short or too long, respectively. When the former condition occurs, the electronic control system activates the pull rolls 46, 48 to draw material from the roll 38 to lengthen the loop 56, while if the latter condition occurs, the pull rolls 46, 48 are deactivated to allow the feed rolls 50, 52 to take up some of the slack.

A photoelectric registration sensor (not shown) is provided adjacent the web path immediately upstream of the feed rolls 50, 52 to ensure that the web 32 is advanced to the correct registration.

No de-curl unit is necessary, since the web 32 moves in a horizontal plane, and the movement of the web 32 is positively controlled at all times by the pull rolls 46, 48 and the feed rolls 50, 52.

The Press

The press 20 comprises a base 62, two uprights 64, 66 supported on the base 62 and spaced from each other (see FIG. 3) and a top portion 68 bridging the upper end of the uprights 64, 66. A horizontal crank shaft 70, providing the driving force for both the scoring operation and the blanking and forming operation, is located in the top portion 68.

Figure 5:
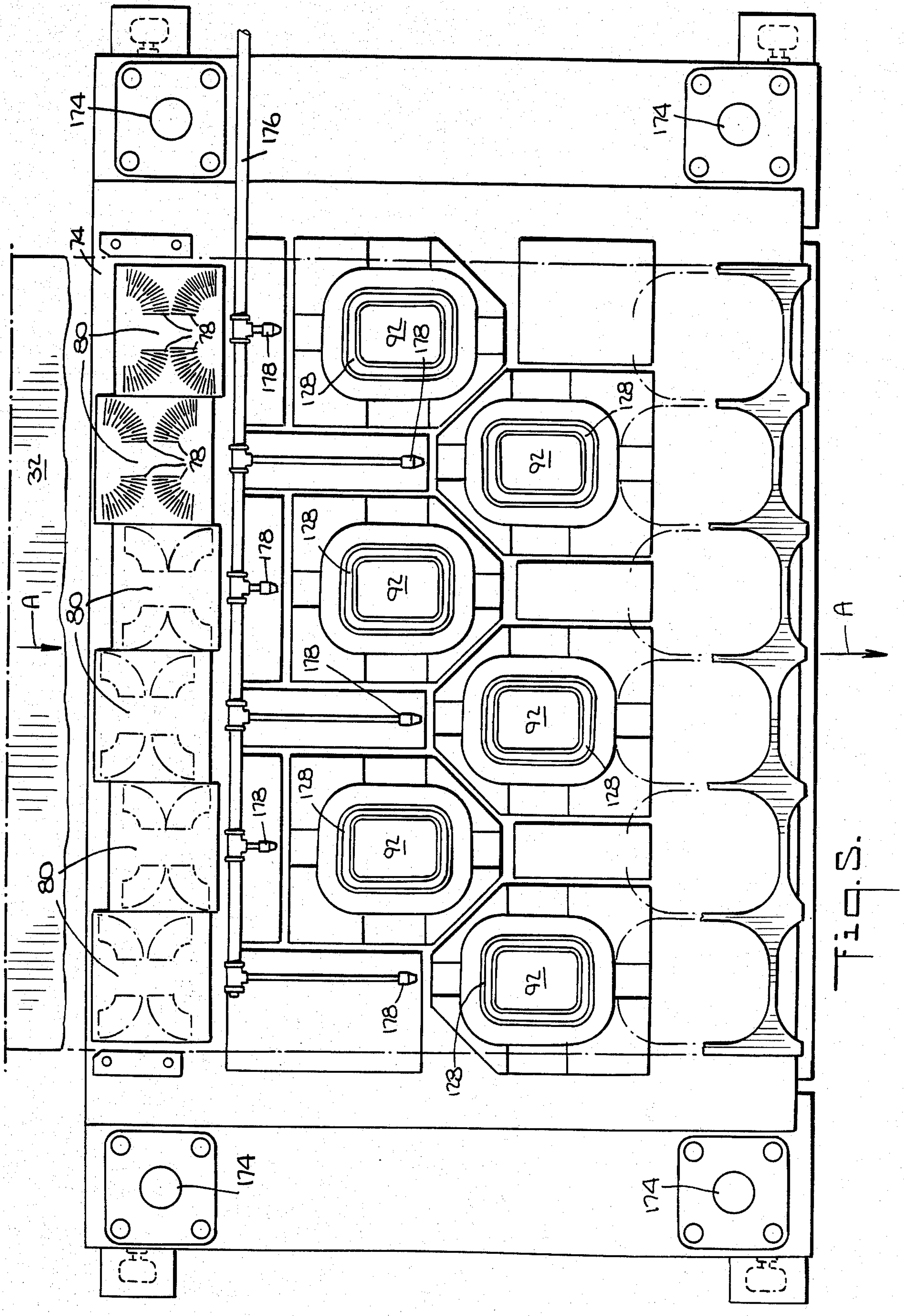
FIG. 5 is a top plan view of the lower scoring platen and the male die of the press of FIG. 1.
Figure 6:
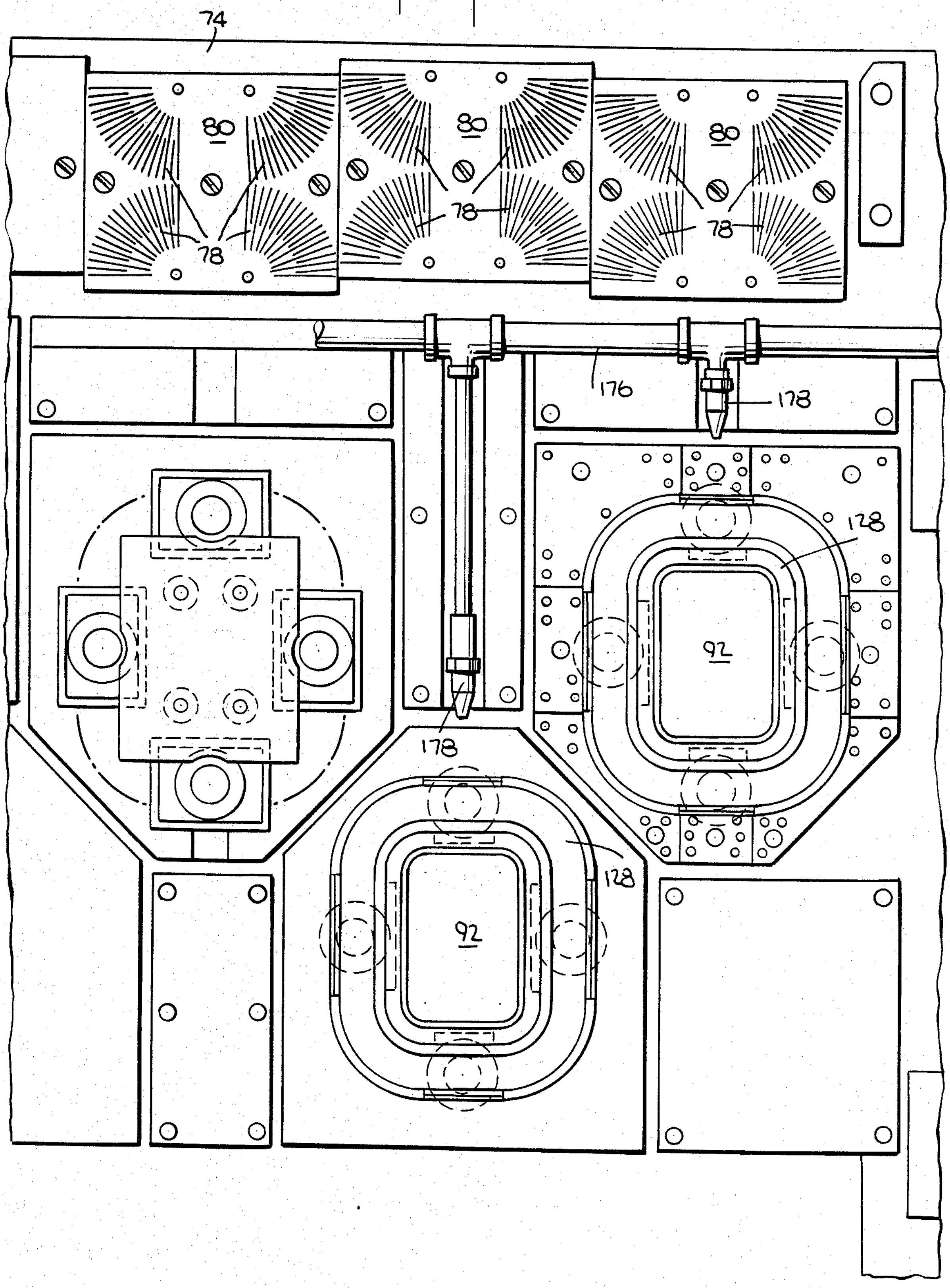
FIG. 6 is a more detailed description top plan view of a portion of the scoring section and the male die shown in FIG. 5.
Figure 7:
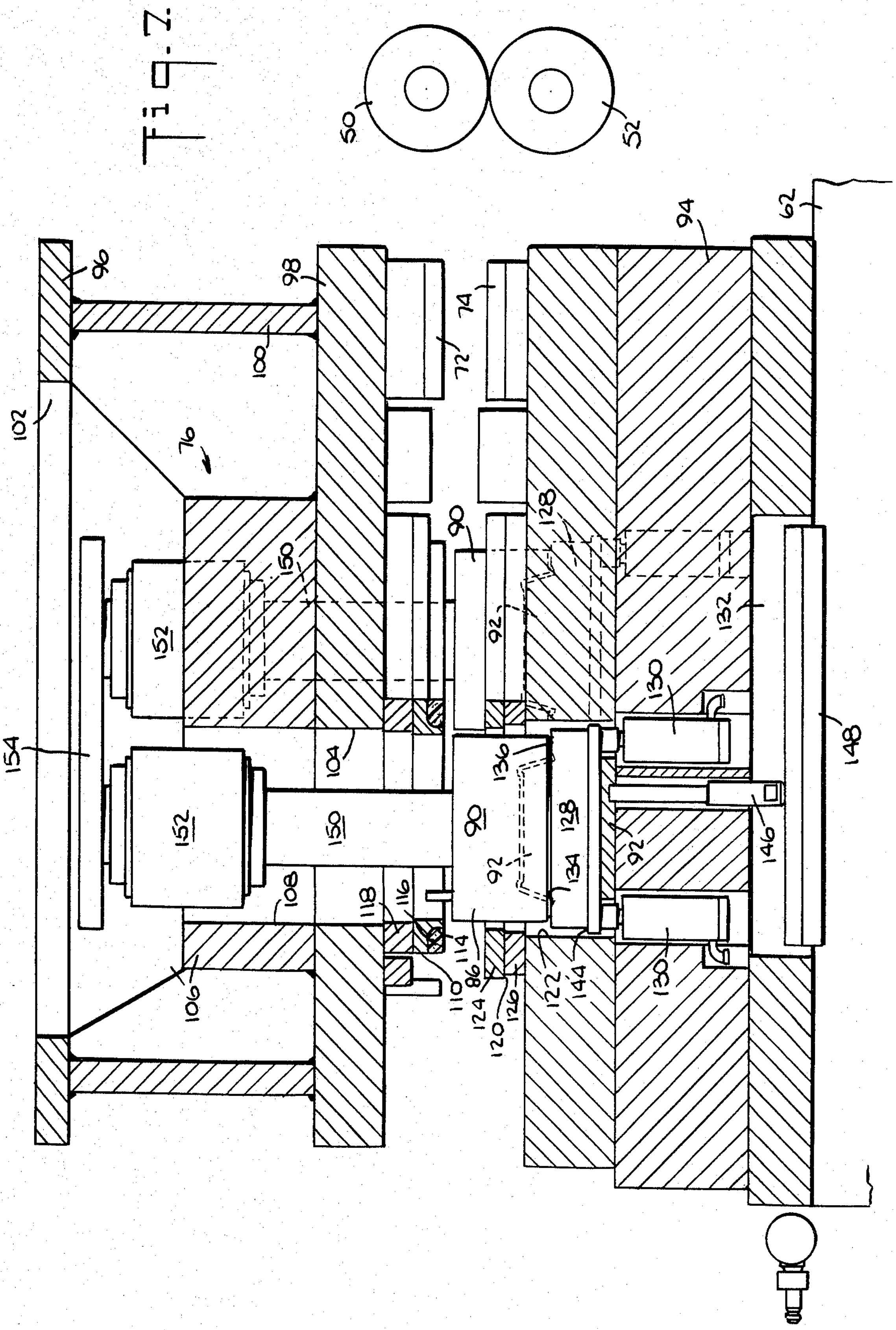
FIG. 7 is a sectional view, taken from line 7—7 of FIG. 3, of the die set and the base of the press.

As can be seen particularly clearly in FIGS. 5 and 7, the press 20 is provided with upper and lower scoring sections 72, 74 between which the web 32 is fed by the feed rolls 50, 52. The lower scoring section 74 is secured immovably to the lower die shoe 94, while the upper scoring section 72 is secured to the upper die shoe 76 (see FIG. 7). In the preferred embodiment shown, the lower scoring section 74 has male rules 78 for scoring th web 32, while the upper scoring section 72 has complementary female grooves (not visible in the views shown). In the preferred embodiment shown, six trays are formed from a single width of the web 32. Accordingly, six sets 80 of rules and of grooves are shown. As can be seen from FIGS. 5 and 6, the six sets 80 of rules and grooves are arranged in two slightly staggered rows transverse to the direction of movement of the web 32, indicated in FIG. 5 by arrows A. As can be seen, the scores 82 are formed in the corner sections of each blank. This causes the wrinkles that tend to form when the flat blank is drawn to crowd into the corners, where they are less obtrusive. The scoring pattern shown is that disclosed in U.S. Pat. No. 4,026,458, referred to above, and results in a tray 84 like that shown in FIG. 2.

As the web 32 is advanced in preset increments by the feed-in metering unit 36, it proceeds from the scoring section to the blanking and forming section of the press 20. The blanking and forming section includes an upper, female die 86 and a lower, male die 88 which respectively comprise six upper formers 90 and six complementary lower formers 92 and which are respectively received in the upper and lower die shoes 76, 94.

Figure 3:
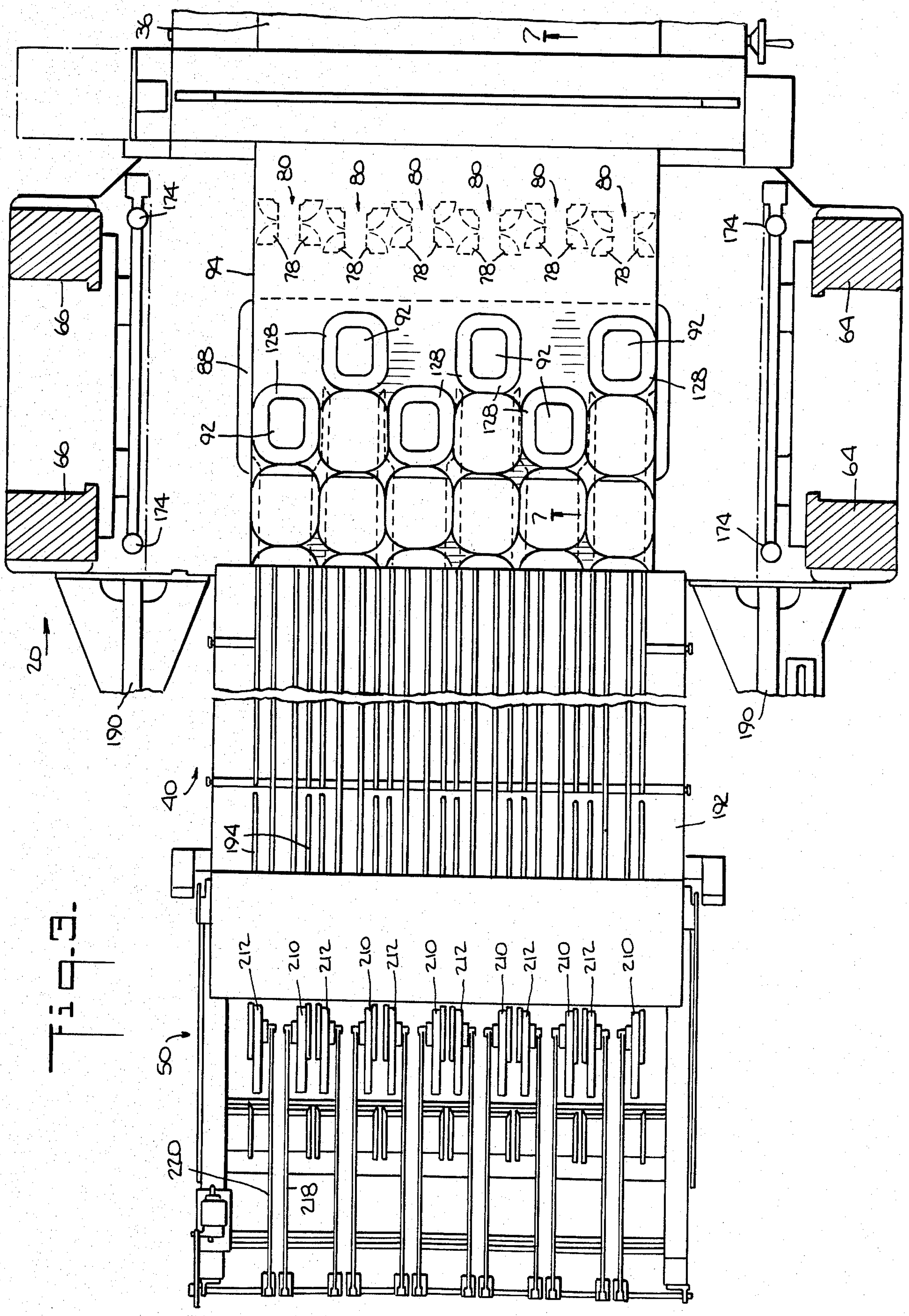
FIG. 3 is a view taken from line 3—3 of FIG. 1.

As can be seen, the six sets of formers 90, 92 are divided into two staggered transverse rows of three each. The spacing between these two rows is what requires the six sets 80 of scoring rules and grooves also to be slightly staggered relative to each other, as shown in FIG. 3.

The upper die shoe 76 comprises two parallel plates 96, 98 secured to each other by means of gussets 100. The upper plate 96 has a central aperture 102 to accommodate the movement of the female die 86. The lower plate 98 is provided with six apertures 104. A supporting structure 106 connects the periphery of the central opening of the upper plate 96 with the lower plate 98. The supporting structure 106 is provided with six vertical passageways 108, each communicating with an aperture 104.

The underside of the lower plate 98 of the upper die shoe 76 also carries six blanking rings 110, each surrounding a respective aperture 104. Each blanking ring 110 comprises a sleeve 112 having a shoulder 114 on its lower, radially outer surface. A foam rubber cushion 116 is secured to the shoulder 114 and extends slightly below the lower edge of the sleeve 112. The blanking ring also includes an upper ring 118, which connects the sleeve 112 to the lower plate 98 of the upper die shoe 76.

The lower die shoe 94 supports six stationary blanking elements 120, each disposed directly beneath a respective blanking ring 110 and surrounding a well 122 containing a male former 92. Each blanking element 120 comprises two rings 124, 126, the lower of which is secured directly to the lower die shoe 94 and the upper of which rests on the lower ring 126. The upper ring 124 protrudes somewhat over the lip of the well 122 containing the male former 92, and is vertically aligned with the blanking edge of the corresponding blanking ring 110, i.e., the radially outer edge of the shoulder 114.

Each male former 92 is surrounded by a respective draw pad 128 received in the same well 122. The draw pad 128 has a lower portion adjacent the interior surface of the well 122, and an upper portion spaced therefrom. The draw pad 128 is supported on a plurality of pistons 130, which are gas-powered to raise the draw pad 128 independently of the male former 92. The gas pressure to raise and lower the draw pads 128 is supplied through a well 132 in the base 62 of the press 20.

The upper portion of each draw pad 128 is spaced from the surface of the blanking element 120 a sufficient distance to clear the interior overhang of the latter. The radially inner portion 134 of the upper surface of the draw pad defines an inwardly sloping shoulder, while the radially outer portion 136 is horizontal.

As can be seen in FIGS. 8, 10, 12 and 13, each male former 92 comprises a solid cast body 138 the upper portion of which has the shape to be imparted to the interior of the tray. Four guide plates 140 are secured to the sides of each male former body 138 and bear most of the guiding occurring between the former 92 and its draw pad 128. In the preferred embodiment shown, the lower extremity 142 of the male former 92 protrudes laterally and serves as a stop for the under surface of the draw pad 128. The stationary blanking element 120 overhangs the well 122 in which the male former 92 is received, and cooperates with a shoulder 144 provided in the outer surface of the draw pad 128 to limit the upward motion of the latter. Each male former 92 rests on four vertical pins 146 (see FIG. 6; for clarity of illustration, only one pin 146 is shown in FIGS. 7, 8, 10, 12 and 13), the lower end of each pin 146 resting on a large plate 148, which is supported on a fluid cushion, preferably an air cushion, (not shown) provided in the central well 132 in the base 62 of the press 20.

Each of the six female formers 90 is affixed to the lower end of a respective shaft 150. Each shaft 150 is slidably received in a respective bushing 152 and passes through one of the apertures 104. The upper end of each shaft 150 is secured to the bottom of a plate 154, which is free to reciprocate vertically through the central opening 102 in the upper plate 96 of the upper die shoe 76. The plate 154 of the female die 86 is secured by hydraulic clamps 156 to a first vertically movable slide or platen (not shown).

Each female former 90 comprises a lower portion 160 whose lower surface is configured in the shape to be imparted to the side walls and a portion of the bottom of the exterior of the tray. Preferably, this portion of the female former 90 is made of cast aluminum-bronze and is heated by means of built-in heating coils 162. To provide an indentation in the bottom of the tray, a separate plate 164 is secured to the interior of the female former body 160, and is biased downward by a spring 166. The body 160 of the female former 90 is secured to an insulative plate 168 which prevents the unnecessary loss of heat from the female former 90. An upper plate 170 connects the insulative plate 168 to the shaft 150. An electrical supply line 172 provides current to the heating coils 162 in the body 160 of the female former 90.

Figure 4:
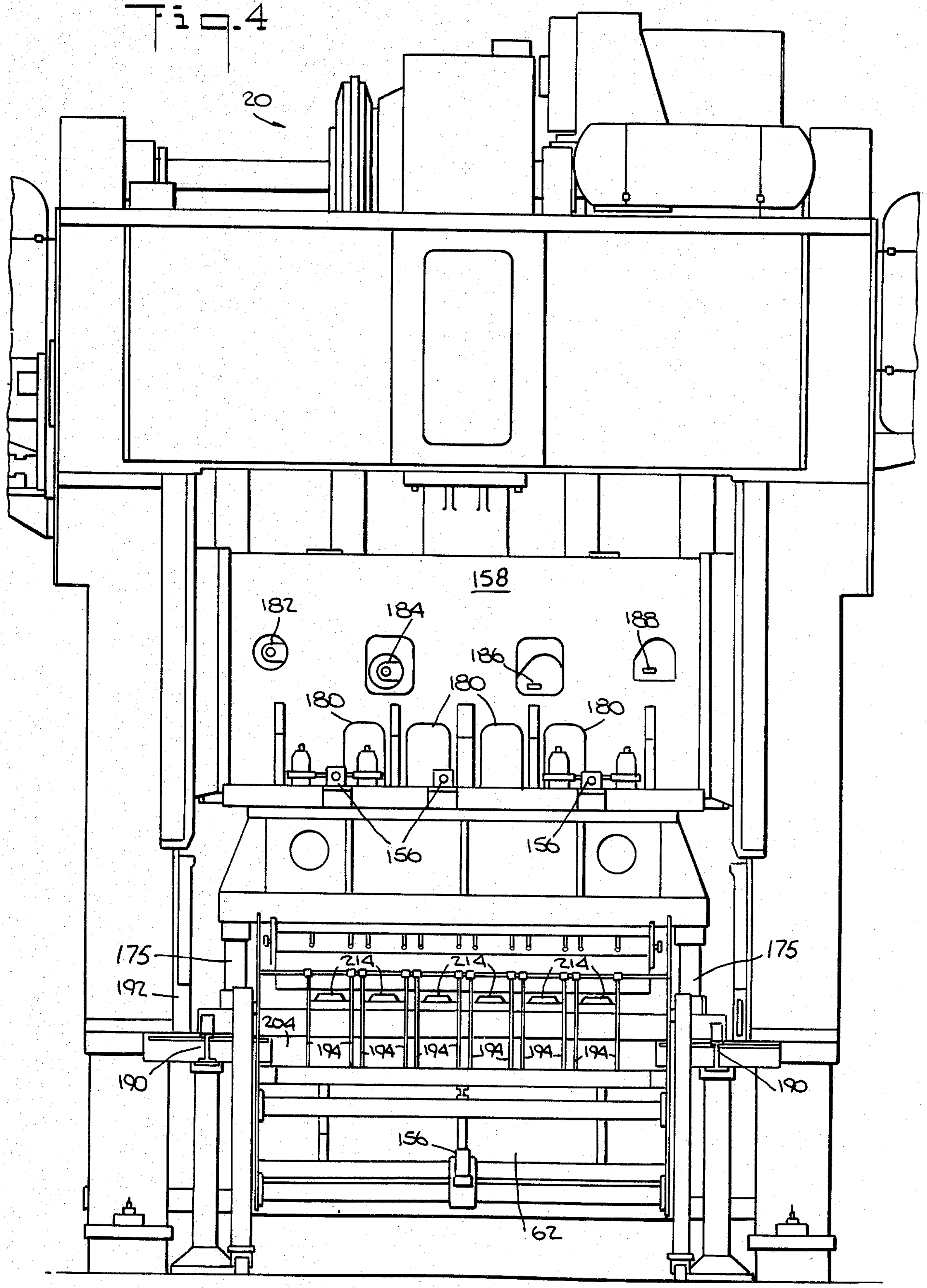
FIG. 4 is a rear plan view of the press of FIG. 1.

The upper die shoe 76 is secured by means of hydraulic clamps 156 to a second vertically movable slide 158 (see FIG. 4). The second slide 158 is provided with a central aperture (not visible) for passage of the first slide. For this reason, the first and second slides are hereinafter referred to as the "inner" and "outer" slides, respectively.

The inner and the outer slides are vertically reciprocated by the crank shaft 70 by means of respective throws or eccentrics (not shown) which are positioned to provide the correct relative timing of the movement of the female die 86 (attached to the inner slide) and that of the upper scoring platen 72 and blanking rings 110 (both secured to the outer slide 158), as disclosed in U.S. Pat. No. 3,902,347, for a "Mechanical Press, Especially a Cupping Press", issued Sept. 2, 1975, to M. L. Ridgway et al. and assigned to Minster Machine Company. The disclosure of U.S. Pat. No. 3,902,347 is incorporated herein by reference.

The outer slide 158 is conventionally guided for vertical movement by eight vertical ways or gibs (not shown) provided at four points on the perimeter of the slide 158. In addition, four guideways 174 are used to guide the reciprocal motion of the die in a conventional manner, the guideways 174 being part of the lower die shoe 94 and are slidably received on guideposts 175 in the upper die shoe 76.

The lowering of the outer slide 158 to score the web 32 also causes the blanking rings 110 to cooperate with the stationary blanking elements 120 to cut six blanks from the already scored portion of the web 32. The inner slide is then lowered, causing the female formers 90 to press the scored blanks down around the male formers 92, forming the blanks into trays in a manner to be described in detail below.

Immediately upstream of the blanking and forming section is a regulated air line 176, which supplies timed, regulated air flow to six air jet nozzles 178. Each nozzle 178 is positioned to blast a jet of air downstream across a respective male former 92 for the purpose of ejecting a formed tray from the press 20.

Access holes 180 are provided at the back of the press 20 to afford access to the hydraulic clamps 156 which secure the die set (i.e., the dies 86, 88, die shoes 76, 94 and draw pads 128) to the slides. Controls 182, 184 for adjusting the vertical position of the slides are also provided, as are respective 5-digit shutheight indicators 186, 188 for the inner and outer slides. This permits precise adjustment of the inner and outer slide positions to provide the desired forming pressure and scoring depth, respectively.

Also at the rear of the press 20 are provided two rails 190 for changing die sets. The manner of using the rails 190 is described below.

The Output Conveyor System

Once a finished tray has been ejected by air-jet nozzles 178 from the press 20, it is received, upside-down, on the upper surface of a conveyor table 192, disposed between the rails 190, and moved along table 192 to the stacking device 50 at the back end thereof. Railings 194 are provided to divide the upper surface of the conveyor table 192 into lanes, to prevent collisions among trays.

A pressurized gas supply 196 is disposed beneath the conveyor table 192. The table 192 comprises a plenum chamber 198 containing a gas, preferably air, at low pressure, which is supplied by supply 196 via tube 200. The upper surface of the table 192 is provided with slits 202 which are inclined at such an angle as to direct jets of air from the interior of the plenum chamber 198 into the surrounding atmosphere in a direction away from the press 20. The air jets propel the upside-down tray along the conveyor table 192 and off the end thereof onto the stacker 50. A small ramp 204 is provided at the back end of the conveyor table 192 to carry the trays to the stacker 50.

The Stacking System

The stacking system 50 includes a dummy supported on the upper end of a powered mechanism 208, which biases the dummy 206 upward. As the trays slide down the ramp 204, they fall onto the dummy 206 and are stacked on top of each other. The dummy 206 comprises two generally parallel spaced-apart bars 210, 212. The outer lateral surface of each bar 210, 212 is shaped to fit one side of the interior of the tray 214. The shape of the dummy 206 forces the first tray 214 to assume a certain orientation, and each succeeding tray 214 nests on its predecessor. As the stack 216 of trays grows, the dummy 206 moves downward. When the dummy 206 has been lowered as far as possible, the stack 216 of trays is removed in the following manner.

At the bottom of the dummy 206 are two parallel conveyor belts 218, 220 disposed between the two bars 210, 212 of the dummy 206. As the dummy 206 is lowered past the belts, the stack 216 of trays is deposited on the belts 218, 220, which carry the stack 216 away to be packaged. Once the stack 216 has been removed from the dummy 206, the latter is returned to its original position.

While the stack 216 is being removed from the dummy 206 by the conveyor belts 218, 220, it is necessary to prevent additional trays being added to the stack, since otherwise, once the stack 216 begins to move away from the conveyor table 192, the newly arriving additional trays would fall on the floor and would have to be retrieved manually. Accordingly, a pair of retractable rods 222, 224 is provided in the end of the conveyor table 192. (For simplicity of illustration, the rods 222, 224 are shown housed in a box located on the underside of the conveyor table 192 and containing a suitable conventional extension and retraction mechanism, but it will be clear that the box is unnecessary, and in practice the box is preferably omitted, the rods 222, 224 and the extension and retraction mechanism being disposed directly on the underside of table 192.) The rods 222, 224 are about the same distance apart as the conveyor belts 218, 220. When extended, they do not interfere with any tray already on the stack 216, but do intercept any additional trays falling off the end of the conveyor table 192. The rods 222, 224 are ordinarily retracted, but are extended when a stack 216 is about to be deposited on the conveyor belts 218, 220. When the dummy 206 has returned to its original position, the two rods 222, 224 are retracted, allowing the trays 226 that have accumulated on them to drop the short distance to the dummy 206, beginning a new stack.

Operation of the Press

As already stated, the proper timing for the movements of the inner slide, supporting the female die 86, and the outer slide 158, supporting the blanking rings 110 and the female grooves of the scoring section, is provided by means of a single overhead shaft 70 provided with eccentric throws driving the two slides. The throws for each slide are out of phase with those of the other slide, as is described in U.S. Pat. No. 3,902,347.

Figure 8:
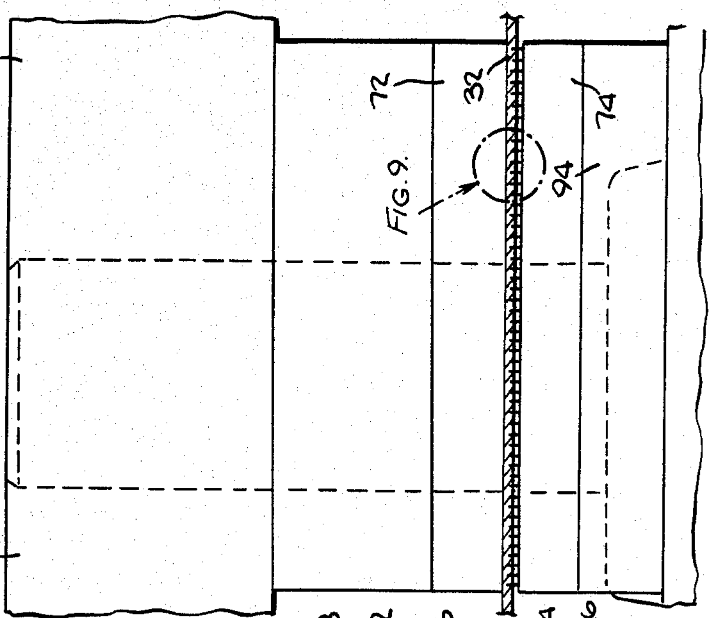
FIGS. 8, 10, 12 and 13 are sectional views similar to that of FIG. 7, showing the scoring platens and one male and one female former of the press of FiG. 1. in various stages of the operating stroke of the press.
Figure 8:
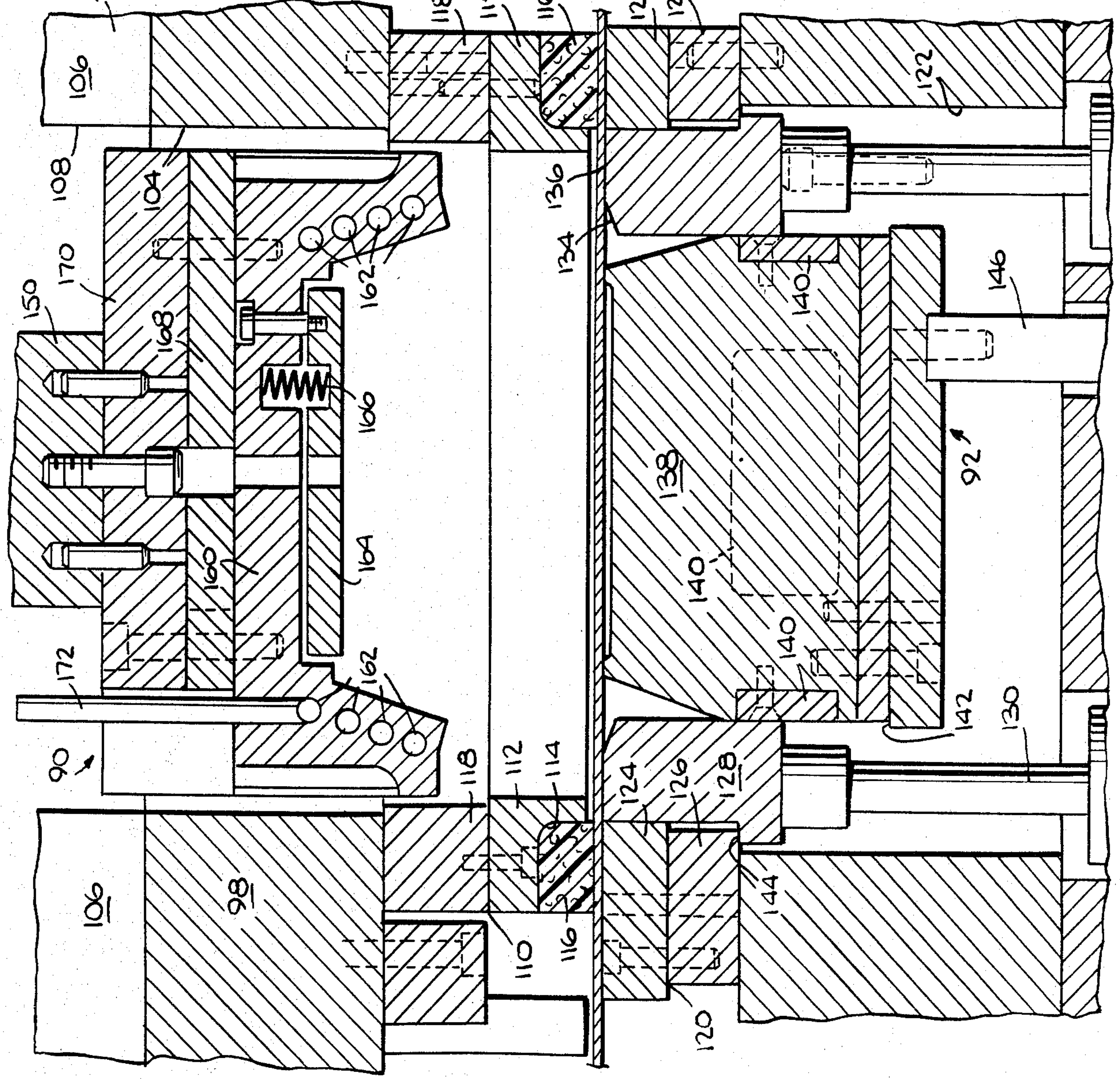
Figure 9:
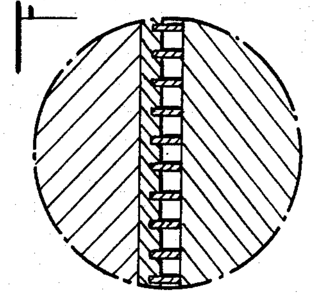
FIG. 9 is a detail, as indicated in FIG. 8, illustrating the operation of the scoring section of the press.
Figures 10, 11:
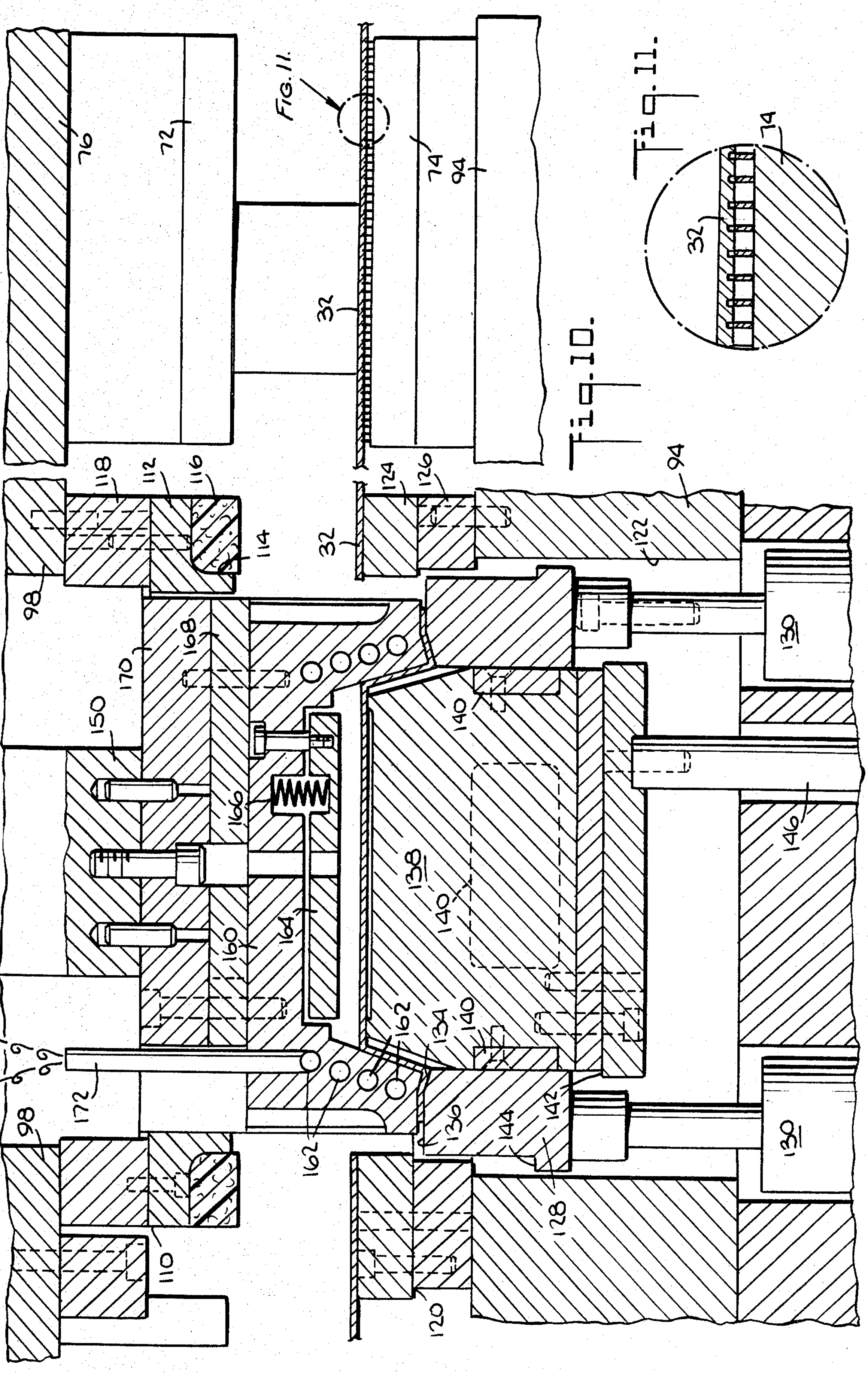
FIG. 11 is a detail similar to that of FIG. 9, showing the web after scoring.

The paper web 32 is fed through the scoring section with the coated side of the web 32 down, while the upper die shoe 76 is in the raised position shown in FIG. 8. After being fed up into the press the correct preset distance, the web 32 is halted by the feed-in unit 36, and the upper scoring platen 72 is lowered by the outer slide 158 to score the web 32 (see FIG. 8). The female platen 72 is then raised, and the web is advanced by the same preset interval, to bring a portion of the web 32 that has previously been scored into the blanking and forming section, and an unscored length of web 32 into the scoring section. When the outer slide 158 is lowered (see FIG. 8), moving both the upper scoring platen 72 and the blanking rings 110 downward, the blanking rings 110 descends until the foam rubber cushions 116 are compressed sufficiently to allow the bottom surface of each blanking ring 110 to rest on the upper surface of the corresponding draw pad 128, securing the scored paper firmly in position. The radially inner portion of the blanking ring 110 shears the web in cooperation with the inner edge of the rim 124 of the stationary blanking element 120.

The inner slide is then moved downward by the crank shaft throws while the draw pad 128 is forced downward by the upper die 86, until the female and male formers engage each other, pressing the paper between them. During the downstroke of the dies, the gas in well 132 is compressed and a portion of the gas is expelled into a surge tank (not shown). The periphery of each female former 90 also grips the periphery of the blank against the draw pad 128 beneath it, holding the blank securely in place even after the continuing rotation of the crank shaft 70 raises the blanking rings 110 (see FIG. 10).

Figure 12:
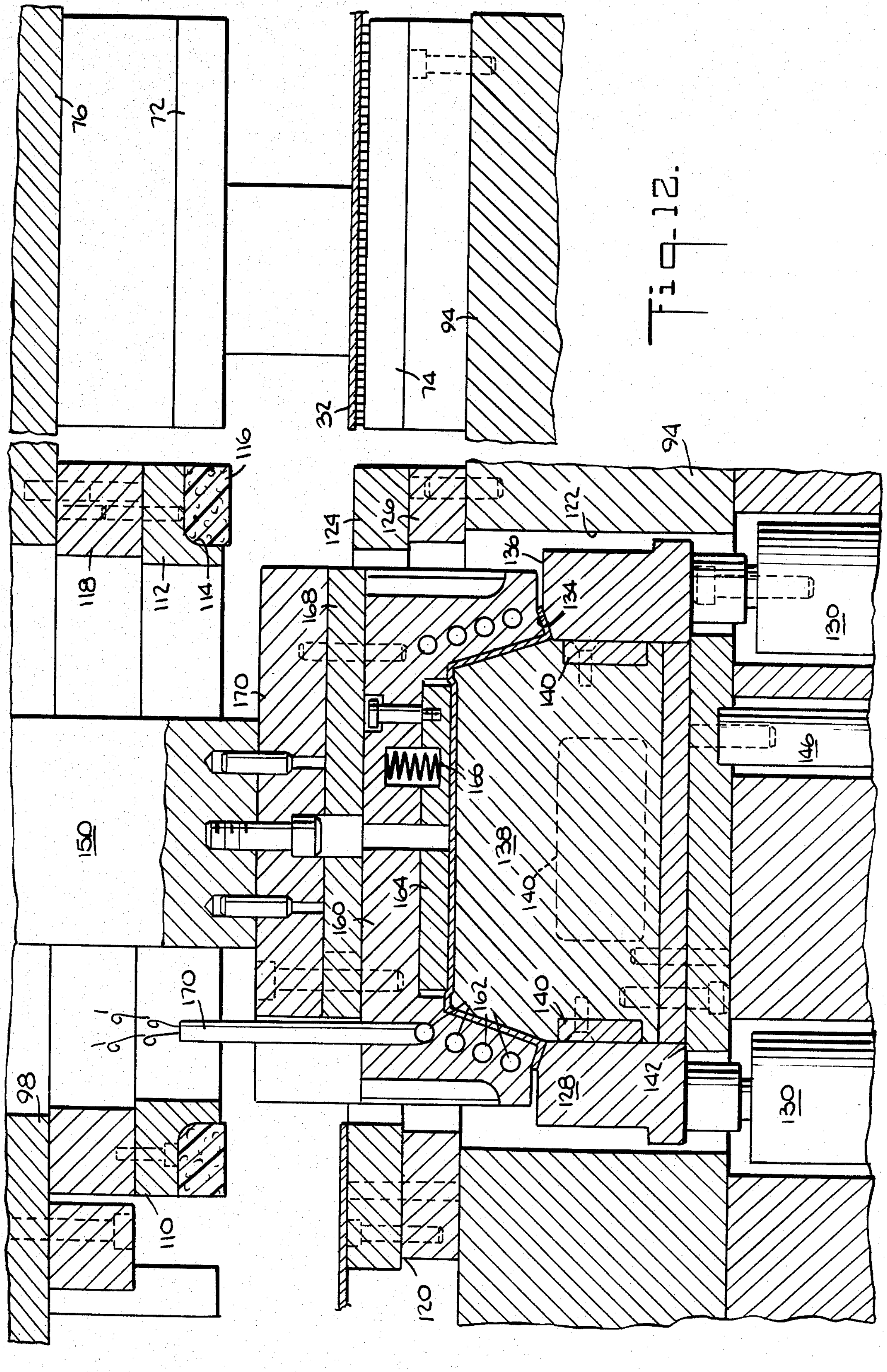

The female die 86 and the draw pads 128 continue to move downward until the male formers 92 and the draw pads 128 are separated from the female formers 90 only by the thickness of the now completely shaped product (see FIG. 12). The male die 88 and the female die 86 descend together, i.e. at the same speed, from this point, the male die 88 being forced up against the paper by its air cushion. When the dies 86, 88 bottom out, they begin the upward stroke, the male die 88 being urged upward by the air cushion. The long dwell of the paper between the stacked dies 86, 88 (117° of the stroke cycle) ensures that the desired shape is permanently imparted to the paper. As the dies 86, 88 and the draw pad 128 are raised to their original position, the radially inward, inclined shoulders 134 of the draw pads 128 serve to raise the products above the male formers 92

Figure 13:
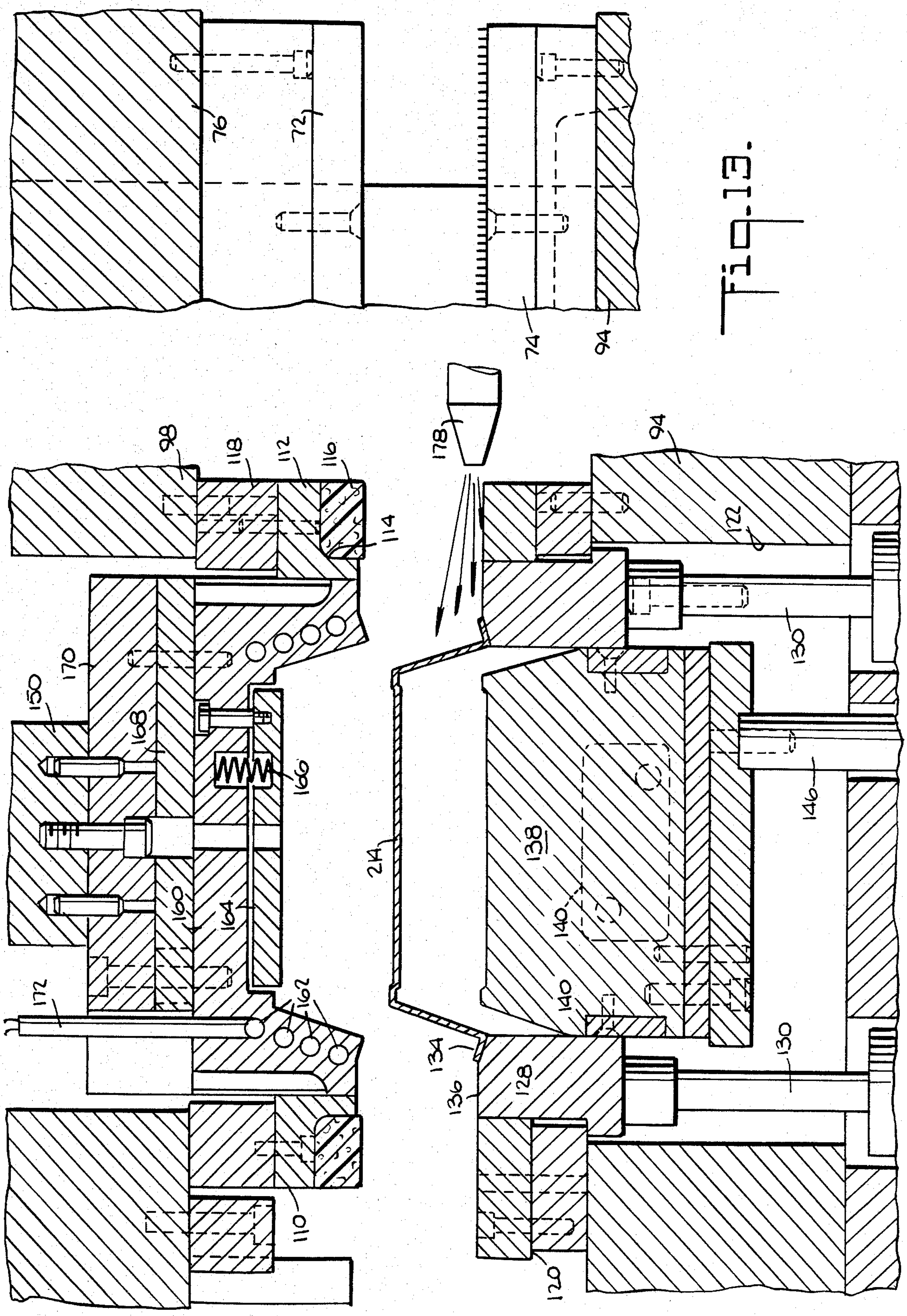

(see FIG. 13). The air jet nozzles 178 are activated to eject the products from the press 20 onto the conveyor table 192.

Changing Dies

To faciliate changing die sets, the dies 86, 88, die shoes 76, 94 and draw pads 128 are held in place by means of clamps 156 of a known type, which are operated electrically by push buttons on a control panel. Because of the design of the clamps 156, and because of the vertical guide elements in the press frame, the die set can be clamped in place in the press 20 only when correctly aligned. Thus, when dies are changed, the problem of aligning the new die set is minimized.

To remove a die set from the press 20, the following procedure is used. First, the press 20 is jogged slowly through its cycle until the outer slide 158 is at its lowest position, and the die is then unclamped for example hydraulically. The crank shaft 70 is again rotated, sufficiently to withdraw the slides from contact with the dies 86, 88.

Figure 14:
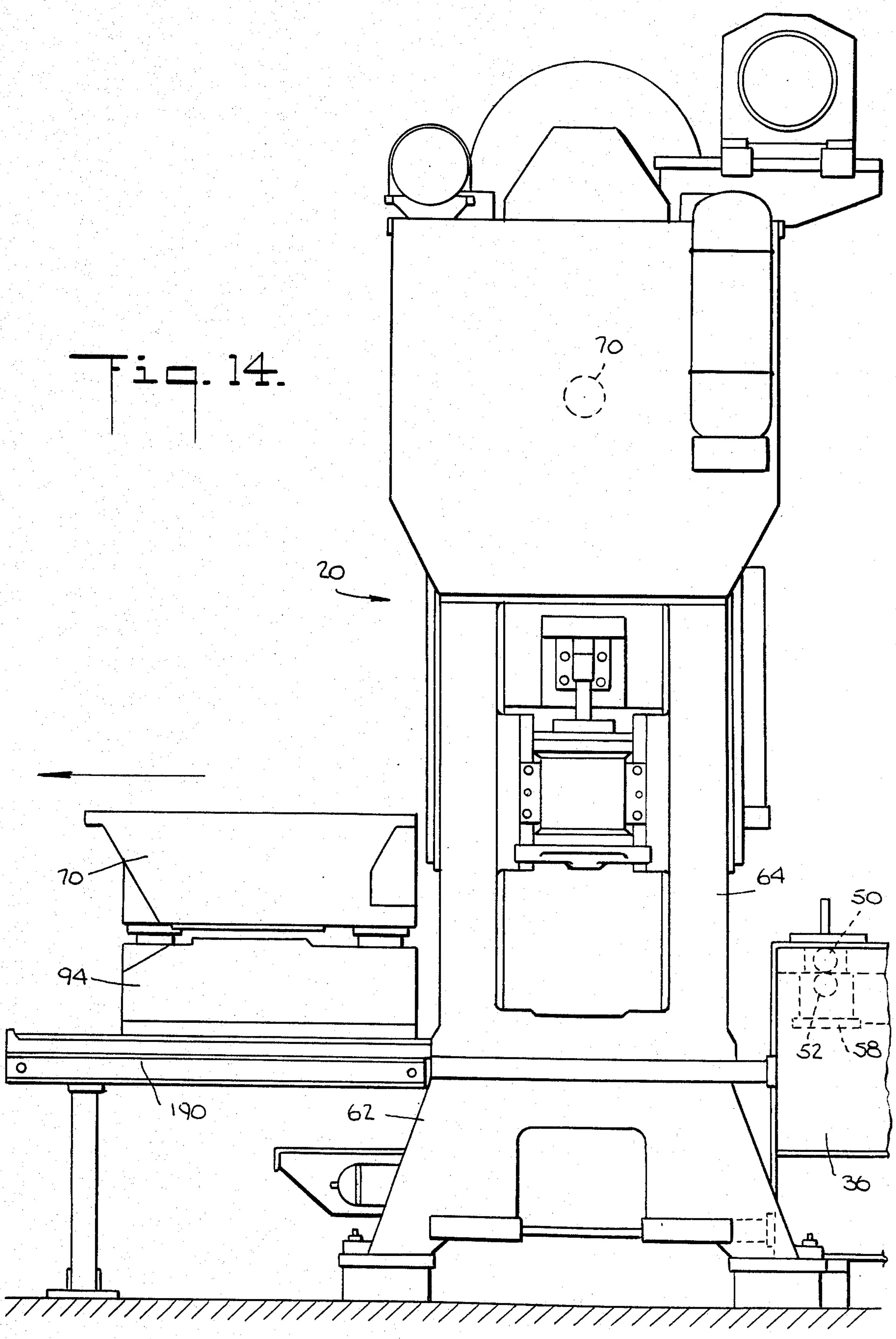
FIG. 14 is a side view of the press of the invention, illustrating the removal of the die set from the press.
Figure 15:
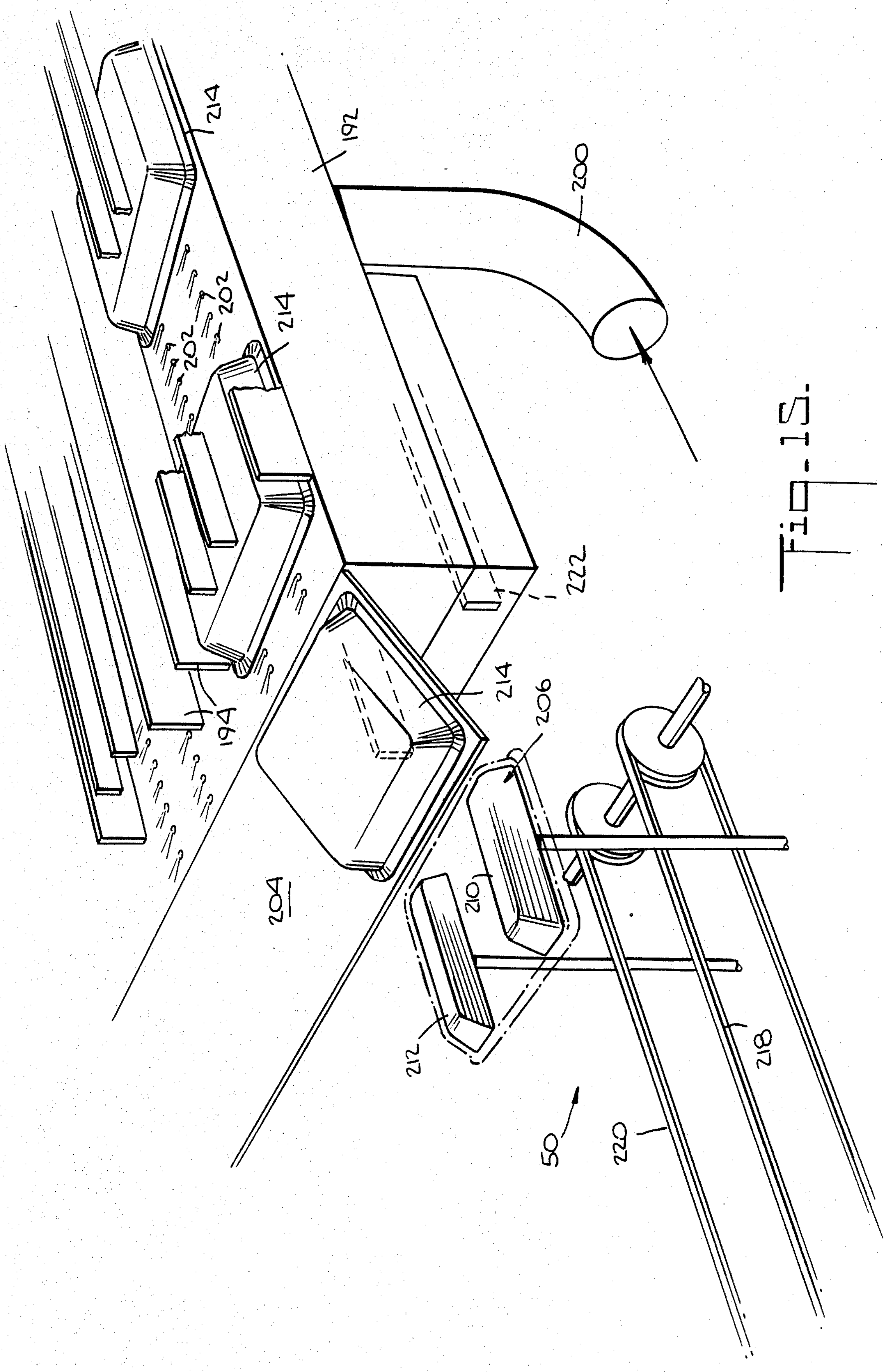
FIG. 15 is a perspective view of of a detail of the tray conveyor and stacking systems.
Figure 16:
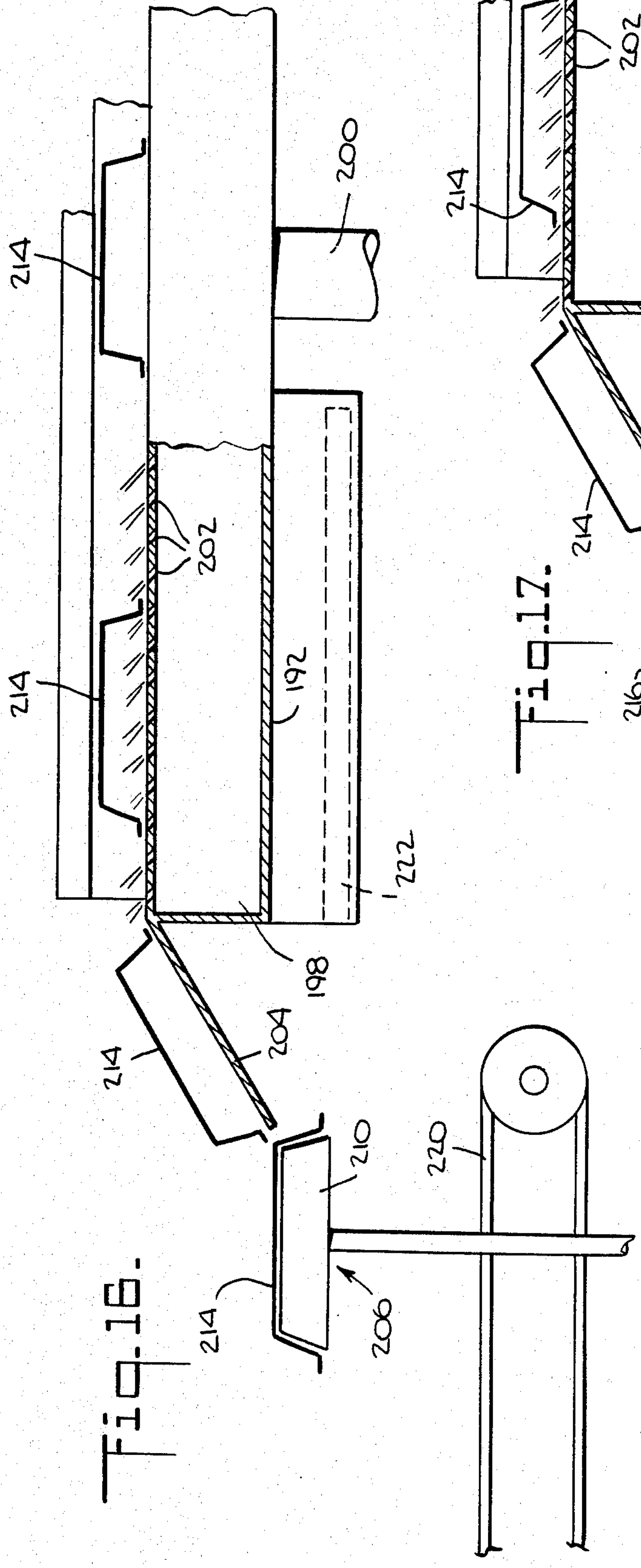
FIGS. 16–18 are views, partly in section, showing the operation of the stacking system.
Figure 17:
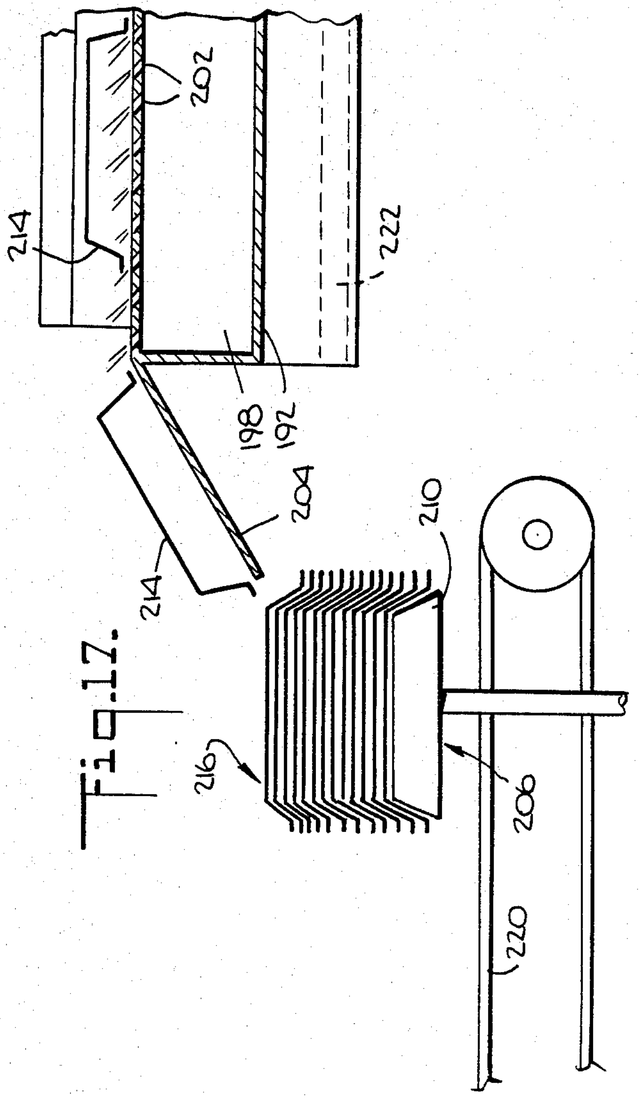
Figures 18, 19:
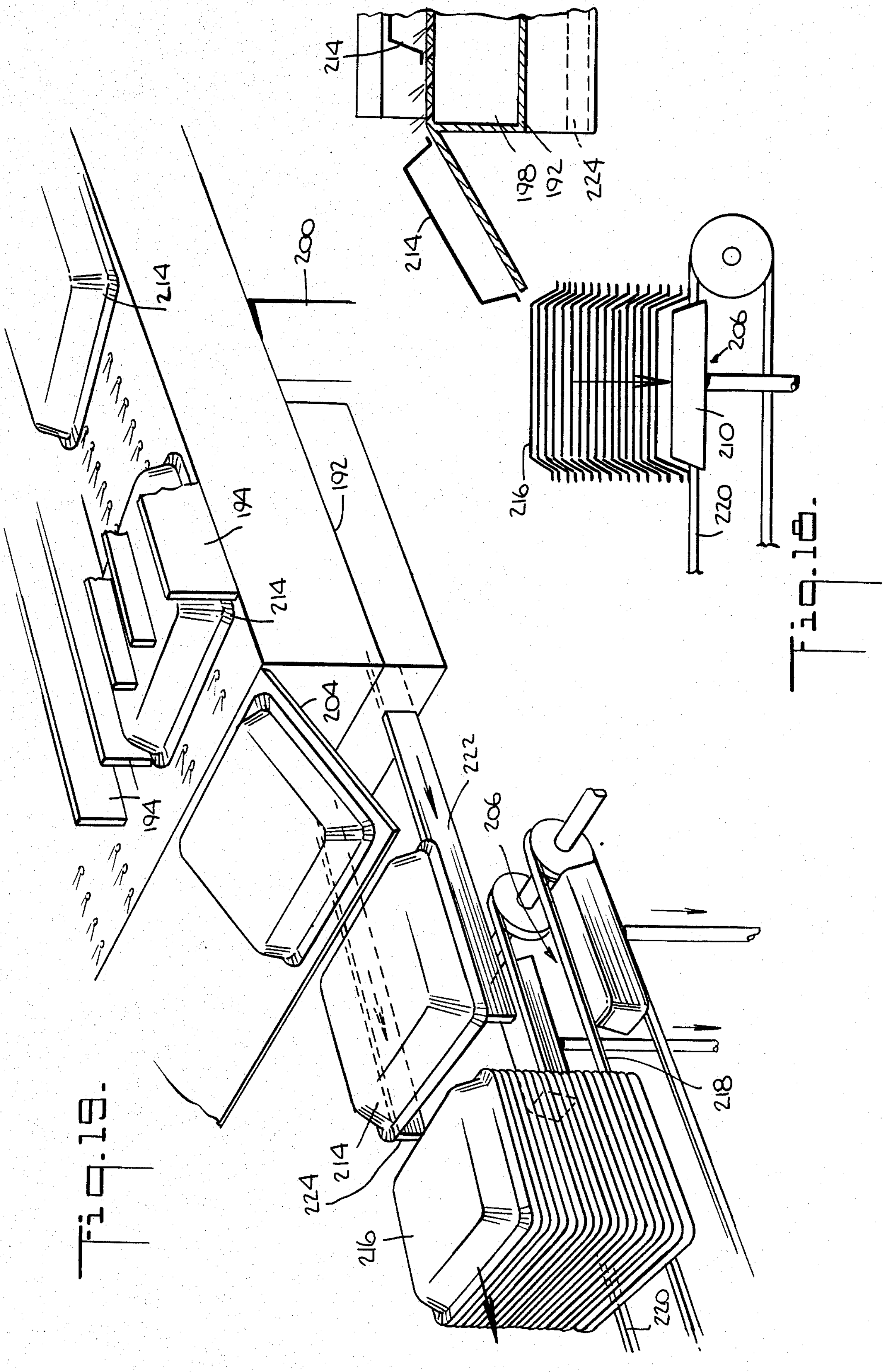
FIG. 19 is a perspective view showing a detail of the operation of the stacking system.

Preferably, a system, such as that disclosed in U.S. Pat. No. 3,986,448, for a "Simplified Rolling Bolster System for Press", issued Oct. 19, 1976, to D. N. Seyfried et al. and assigned to the Minster Machine Company, and the disclosure of which is incorporated herein by reference, is provided for lifting the unclamped die set to the level of the rails 190, powered by a hydraulic pump that can be attached to the side of the press and plugged into hydraulic lines in the press 20 to provide the hydraulic force to raise the die set. A forklift or the like can then be used to extract the die set along the rails 190 (see FIG. 14). A new die set can be put in place by the reverse process.

The foregoing procedure will permit dies to be changed with down-time of approximately two hours. Using conventional systems, it is often necessary to spend as much as twenty-four hours in changing the dies and properly aligning the new set before production can be resumed.

It has been found that with the apparatus of the invention as described above, a much greater number of machine strokes per minute is possible than is conventionally possible. The movement of the web can also be more precisely controlled, since it is moved horizontally under positive control rather than allowed to fall under the influence of gravity. Finally, the amount of waste material produced using the apparatus of the invention is much less than that obtained with conventional equipment.

Although the invention has been described in detail with respect to one preferred embodiment thereof, many modifications and variations thereof will now be apparent to those skilled in the art. Accordingly, the scope of the present invention is to be limited not by the details of the described embodiment but only by the terms of the appended claims.

What is claimed is:

1. A system for forming a web material into a finished product of a desired shape, said system comprising:

first and second dies for cooperating to press a blank between them to form the blank;

reciprocating means for reciprocating said first die along a reciprocation path having a first portion in which said first die is out of contact with said blank and said second die, a second portion in which said first die is in contact with said blank and in partial operative engagement with said second die, and a third portion in which said first die is in full operative engagement with said second die with said blank between said dies; and reciprocating support means for said second die for reciprocating said second die along with said first die while maintaining said second die in full operative engagement with said first die, with a blank between said dies, while said reciprocating means for said first die is moving said first die along said third portion of the reciprocation path of said first die, for maintaining the blank in dwell between said dies with sufficient pressure for forming, while said dies move along said third portion of said reciprocation path.

2. The system of claim 1, wherein said reciprocating support means comprises pneumatic means for urging said second die against said first die while said first die moves along said third portion of said reciprocation path.

3. The system of claim 1, further comprising draw pad means for securing the edge of a blank to prevent undesired wrinkling of the blank during forming thereof.

4. The system of claim 3, wherein said draw pad means is for cooperating with said first die to secure a blank.

5. The system of claim 3, wherein said draw pad means is movable independently of said first die and is movable with said second die, whereby said draw pad means is adapted to cooperate with said first die to separate a formed article from said second die after the completion of the formation of the article.

6. The system of claim 5, wherein said draw pad means is movable independently of both said first and second dies.

7. The system of claim 5 or claim 6, further comprising fluid means for moving said draw pad means.

8. The system of claim 1, wherein one of said dies comprises heater means

9. The system of claim 8, wherein said one die comprises aluminum bronze.

10. The system of claim 8, wherein said one die is said first die.

11. The system of claim 1, further comprising blanking means for blanking a portion of a web before forming.

12. The system of claim 11, wherein said reciprocating means is for reciprocating both said blanking means and said first die with a double action stroke.

13. The system of claim 1, further comprising scoring means for scoring a section of a web to be formed, and further comprising blanking means for blanking a scored section of the web before forming, said reciprocating means powering both said blanking means and said scoring means by a single stroke.

14. The system of claim 13, further comprising feed-in means for feeding a web into said scoring means.

15. The system of claim 14, wherein said feed-in means further comprises means for detecting undesired web slack.

16. The system of claim 1, further comprising conveying means including means for ejecting a finished article from said press and means for conveying it away from said dies.

17. The system of claim 16, wherein said conveying means comprises a plenum chamber adapted to be filled with a gas at low pressure, said plenum chamber having an upper surface in which slits are provided for releasing a gas from said plenum chamber in a direction in which it is desired to move an article.

18. The system of claim 16, wherein said conveying means comprises stacking means for stacking finished articles.

19. The system of claim 1, further comprising releasable clamps for securing said dies in place.

* * * * *